United States Patent [19]

Kondoh et al.

[11] Patent Number: 4,776,768

[45] Date of Patent: Oct. 11, 1988

[54] RADIAL PLUNGER PUMP DRIVEN BY A MOTOR HAVING SEAL MEMBERS FOR PROTECTING THE MOTOR FROM EXPOSURE TO WORKING FLUID

[75] Inventors: Hiroshi Kondoh, Anjo; Akihiko Sawada, Toyohashi; Yoshiaki Ito, Kariya; Kouji Nagai, Anjo; Hideyuki Koiki, Nagoya, all of Japan

[73] Assignee: Nippondenso Co., Ltd., Kariya, Japan

[21] Appl. No.: 80,764

[22] Filed: Aug. 3, 1987

[30] Foreign Application Priority Data

Aug. 9, 1986 [JP] Japan ................. 61-187161
Dec. 26, 1986 [JP] Japan ................. 61-313040

[51] Int. Cl.⁴ .......................... F04B 1/04; F16J 15/00
[52] U.S. Cl. ................................. 417/271; 417/273; 92/58; 277/59; 277/68; 277/186; 277/189
[58] Field of Search ............... 417/271, 273, 423 M; 92/58; 277/59, 67, 68, 181, 182, 184, 186

[56] References Cited

U.S. PATENT DOCUMENTS

| | | | |
|---|---|---|---|
| 2,303,232 | 11/1942 | Rupp | 277/68 X |
| 3,639,085 | 2/1972 | Bertsch et al. | 417/410 |
| 3,874,271 | 4/1975 | Eickmann | 91/491 |
| 4,026,563 | 5/1977 | Bainard | 277/181 X |
| 4,201,521 | 5/1980 | Carlson | 417/53 |
| 4,244,279 | 1/1981 | Stewart et al. | 91/488 |
| 4,494,761 | 1/1985 | Surace et al. | 277/68 X |
| 4,555,223 | 11/1985 | Budecker et al. | 417/462 |
| 4,627,793 | 12/1986 | Kuroyanagi et al. | 417/271 X |
| 4,643,652 | 2/1987 | Eberhardt | 417/364 |
| 4,652,215 | 3/1987 | Kuroyanagi et al. | 417/219 |
| 4,681,023 | 7/1987 | Eickmann | 91/488 |

FOREIGN PATENT DOCUMENTS

| | | | |
|---|---|---|---|
| 1096750 | 1/1961 | Fed. Rep. of Germany | 417/273 |
| 249676 | 12/1985 | Japan | 417/273 |
| WO8304284 | 12/1983 | PCT Int'l Appl. | 417/273 |
| 574991 | 1/1946 | United Kingdom | 91/498 |
| 2126284 | 3/1984 | United Kingdom | 417/273 |
| 2163493 | 2/1986 | United Kingdom | 91/498 |

Primary Examiner—Carlton R. Croyle
Assistant Examiner—Paul F. Neils
Attorney, Agent, or Firm—Cushman, Darby & Cushman

[57] ABSTRACT

A radial plunger pump is provided which includes a motor housing having a motor mounted therein. A pump housing is further provided and has a pump portion defined therein. A shaft is mounted between the motor and the pump portion so that the pump portion operates when rotation of the motor is transmitted to the pump portion by rotation of the shaft. A constant pressure chamber is defined between a first seal member and a second seal member both of which are fixed to the pump housing. The leakage of oil from the pump housing toward the motor housing is prevented by the first and second seal members and the constant pressure chamber. Further, a plate is provided within the constant pressure chamber which rotates with the shaft and prevents the entry of foreign objects into the constant pressure chamber through a constant pressure port which communicates to the ambient atmosphere.

15 Claims, 7 Drawing Sheets

RADIAL PLUNGER PUMP DRIVEN BY A MOTOR HAVING SEAL MEMBERS FOR PROTECTING THE MOTOR FROM EXPOSURE TO WORKING FLUID

FIELD OF THE INVENTION

The present invention relates to a radial plunger pump driven by a motor. The radial plunger pump of the present invention can be used as an oil pump for an automotive brake system, for example.

BACKGROUND OF THE INVENTION

Conventionally, a radial plunger pump having a motor has been provided within a motor housing with a shaft rotatably provided within a pump housing and driven by the motor. Further, pump portion was provided within the pump housing for sucking and discharging the fluid. This conventional pump 13 described in U.S. Pat. No. 4,201,521.

Such a conventional type of the pump, however, has the disadvantage that the fluid within the pump portion leaks toward the motor.

Therefore, the conventional type motor has a seal member provided between the pump housing and the motor housing for preventing the leakage of the fluid. Applicants have found, however, that the seal member provided between the motor housing and the pump housing cannot always seal. Thus, the fluid within the pump housing can leak toward the motor housing even though the seal member is provided.

Since the fluid within the pump housing is applied to the seal member, and since the pressure of the fluid within the pump housing is varied in accordance with the operation of the pump portion, the pressure applied to the seal member should vary and reduce to the negative pressure when the pump portion works. The pressure within the pump housing, on the other hand, increases more than atmospheric pressure when the pump portion stops to work.

SUMMARY OF THE INVENTION

The present invention has an object of reducing the amount of the fluid leaking through the seal member.

In order to attain this object, the radial plunger pump of the present invention provides a constant pressure chamber between the pump portion and the motor housing. The constant pressure chamber is formed between a first seal member and a second seal member both are provided on the shaft between the pump portion and the motor housing. The constant pressure chamber is connected to the atmospheric pressure by a constant pressure hole.

The radial plunger pump of the present invention further includes a plate within the constant pressure chamber. The plate rotates within the constant pressure chamber in accordance with the rotation of the shaft so that the centrifugal force of the plate makes the pressure at the opening of the constant pressure hole increase to greater than the atmospheric pressure. Accordingly, the entry of foreign objects into the constant pressure chamber through the constant pressure hole is prevented.

The radial plunger pump of the present invention uses the first seal member made of an elastic material which is squeezed into a holding hole provided within the pump housing. Since a holding groove is formed at the inner side of the holding hole, the elastic first member is inserted toward the holding groove so that the first seal member is fixed within the holding hole. Accordingly, the first seal member of the present invention will not fall out of the holding hole.

DETAILED DESCRIPTION OF THE PREFERRED EMBODIMENT

Figure 1:
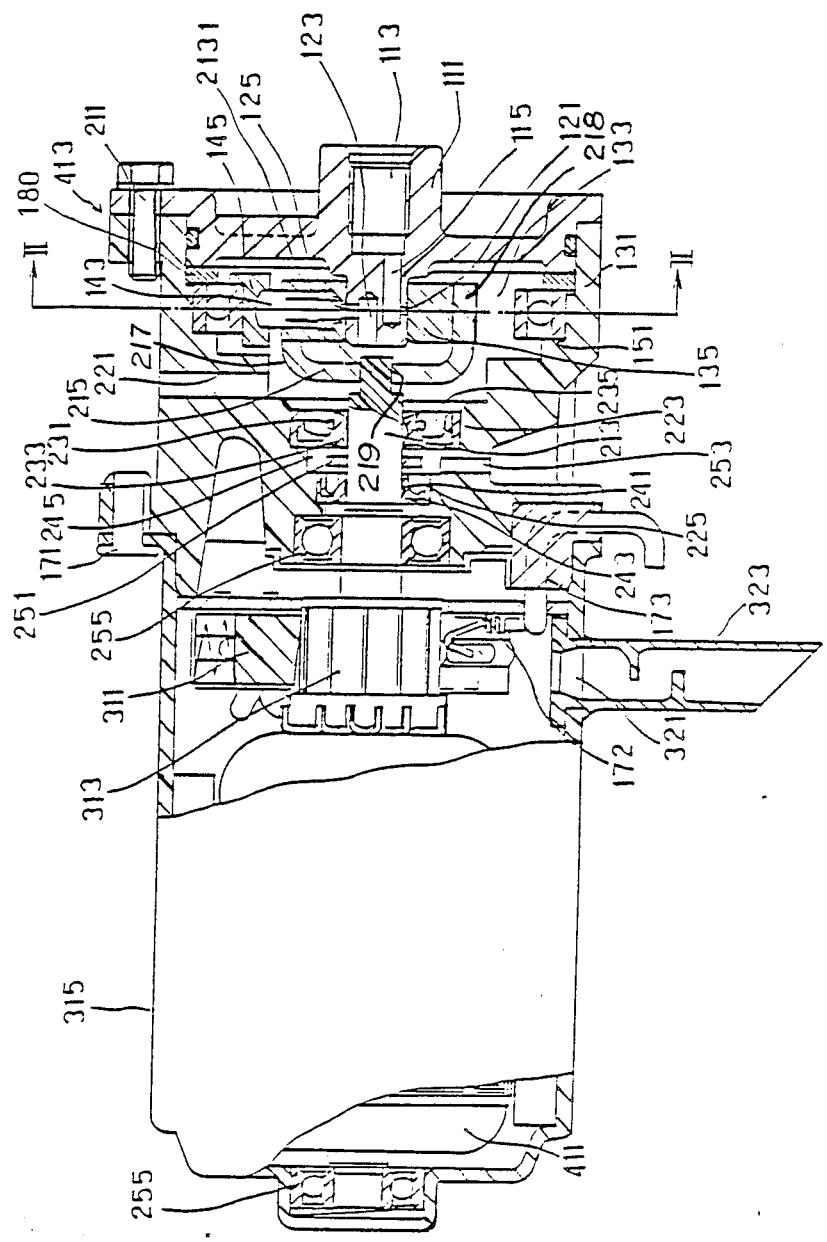
FIG. 1 is a sectional view of the radial plunger pump of the present invention.

The preferred embodiment of the radial plunger pump of the present invention is described hereinafter.

A pump housing 131 made of aluminum alloy has a suction chamber 133 therein. An eccentric ring 151 is provided within the suction chamber in such a manner that an outer race 153 of the eccentric ring 151 is fixed to the inner surface of the pump housing 131 by a wave washer 180.

A pintle housing 111 is provided at the opening end of the pump housing 131 via an O-ring, and the pintle housing is fixed to the pump housing 131 by a bolt 211.

Figure 2:
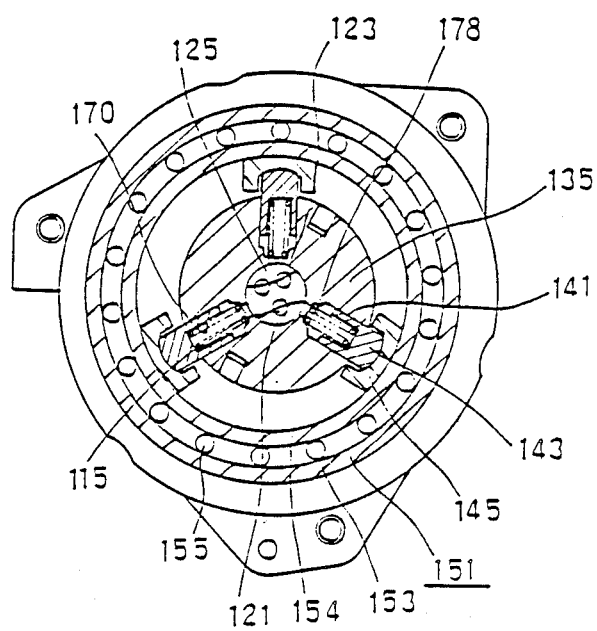
FIG. 2 is a sectional view taken along line II—II of FIG. 1.

The pintle housing 111 has a pintle portion which projects toward the suction chamber 111. A suction connecting port 123 and a discharge connecting port 115 are provided within the pintle portion. The opening end of the suction connecting port 123 faces to the suction chamber 133, and the discharge connecting port 115 is connected with discharge port 113 formed within the pintle housing 111. As shown in FIG. 2, a suction groove 125 and a discharge groove 121 are formed at the outer surface of the pintle portion. A rotor 135 is rotatably supported at the outer surface of the pintle portion.

A plurality of cylinder holes 141 are provided radially within the rotor. A piston 143 is slidably provided within the each of cylinder holes 141. A shoe 145 is provided at the top end of each piston 143, and the top end of each shoe 145 is connected within the inner surface of the eccentric ring 151. The eccentric ring 151 has an inner race 154, an outer race 153 and a plurality of balls 155 provided between the inner race 154 and the outer race 153. A spring 170 is provided within each cylinder hole 141 so that the spring 170 biases the respective piston 143 toward the shoe 145.

Figure 4:
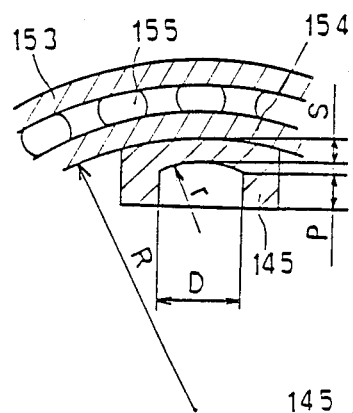
FIGS. 4 and 5 are sectional views of a shoe shown in FIG. 1.
Figure 5:
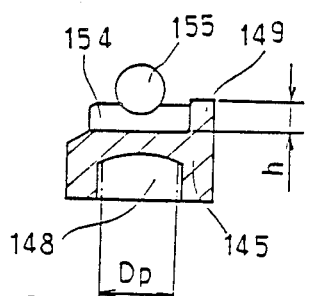

As shown in FIGS. 4 and 5, the shoe 145 has a side guide portion 149 to which the side surface of the inner race 154 abuts so that the movement of the rotor 135 along with the longitudinal axis of the pintle portion is limited by the side guide portion 149 of the shoe 145. It should be noted that there must be a gap of about 0.1 mm gap between side guide portion 149 and the inner race 154 during normal operation so that engagement of the side guide portion 149 with the inner race is prevented.

A holding hole 148 is formed at the center portion of the shoe 145, the depth P of the holding hole 145 is two times deeper than the eccentric amount ϵ of the rotor 135, the inner diameter D of the holding hole 148 has a length calculated by the following formula so that the piston can wobble within the holding hole 148.

$$D = Dp + \frac{2r\epsilon}{R - S}$$

Dp ... the outer diameter of the piston 143, r ... the radius of the top portion of the piston 143, R ... the radius of the inner race 154, S ... the thickness of the central portion of the shoe 154

Figure 7:
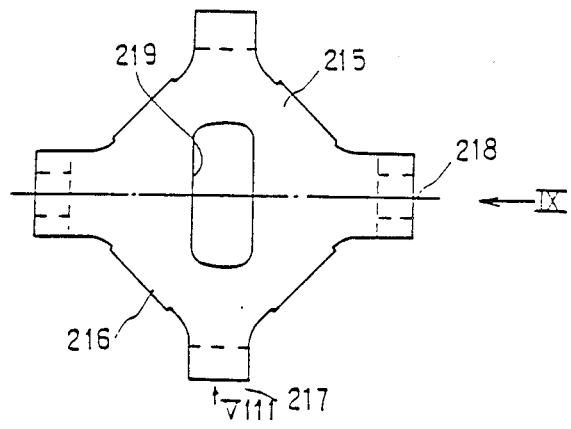
FIG. 7 is a front view of a rotating member.
Figure 8:
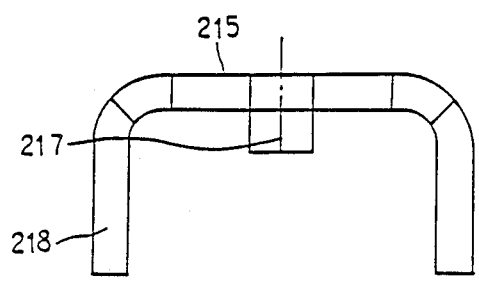
FIG. 8 is a side view of the rotating member shown in FIG. 7.
Figure 9:
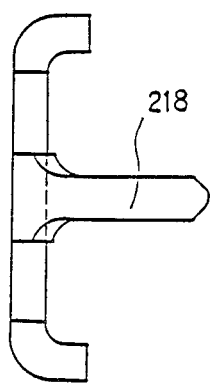
FIG. 9 is a side view of the rotating member shown in FIG. 7.

The rotor 135 is connected with a shaft 213 via a rotating member 215 (shown in FIGS. 7, 8 and 9). A connecting portion 2131 formed at the end portion of the shaft 213 is inserted into the connecting groove 219 formed at the center portion of the rotating member 215 so that the rotating member 215 rotates synchronously with the shaft 214. The end portion of the connecting hook 218 is connected with the rotor 135 so that the rotor 135 rotates synchronously with the rotating member 215. The rotating member 215 has a stopper 217 the end portion of which faces to the rotor 135 so that the movement of the rotor 135 along with the longetudinal axis of the pintle portion is limited by the stopper 217. The stopper 217 and the connecting hook 218 are formed integrally to the rotating member 215. The rotating member 215 also has a inclining wall 216 at the side surface thereof so that the fluid within the suction chamber 135 is diffused by the rotation of the rotating member 215.

The suction chamber 133 is connected to the suction port 221 formed within the pump housing 131 so that the working fluid within a reservoir 415 is introduced into the suction chamber 133 through the suction port 221.

A motor housing 315 is fixed to the pump housing 131 by rivets 171. A motor 411 is provided within the motor housing 315 in such a manner that the shaft 213 of the motor 411 projects through the motor housing 315. The shaft 213 is rotatably supported by a bearing 255 mounted on the motor housing 315. The shaft 213 is also supported by the bearing 255 mounted on the pump housing. A plate 172 on which a brush 311 is fixed is provided at the opening end of the motor housing 315. The brush 311 faces to a commutator 313. The motor housing 315 has an atmospheric hole 321 under the commutator 315, the atmospheric hole 321 is covered by a pipe 323 made of rubber. The lead wire of the brush 311 is supported between the motor housing 315 and the pump housing 131 by a braket 173 made of rubber.

A second seal member 241 is provided on the pump housing 131, the second seal member 241 is held within a second holding portion 225 formed within the pump housing 131. The second seal member 241 has a fixing frame 243 and an elastic member made of rubber covered with the fixing frame 243.

A first holding portion 223 is formed within the pump housing 131 and a first seal member 233 is provided within the first holding portion 223. The first seal member 233 has a fixing frame 235 and an elastic member covered with the fixing frame. The first seal member 233 also includes a spring 231 which biases the fixing frame toward the shaft 213.

As shown in FIG. 1, the outer diameter of the second holding portion 225 is smaller than that of the first holding portion 223. Because the first seal member 233 is fixed within the first holding portion 223 after the second seal member 241 is fixed within the second holding portion 225.

Figure 10:
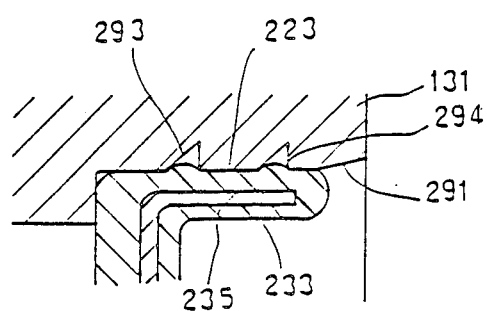
FIG. 10 is a sectional view showing a part of seal member.
Figure 11:
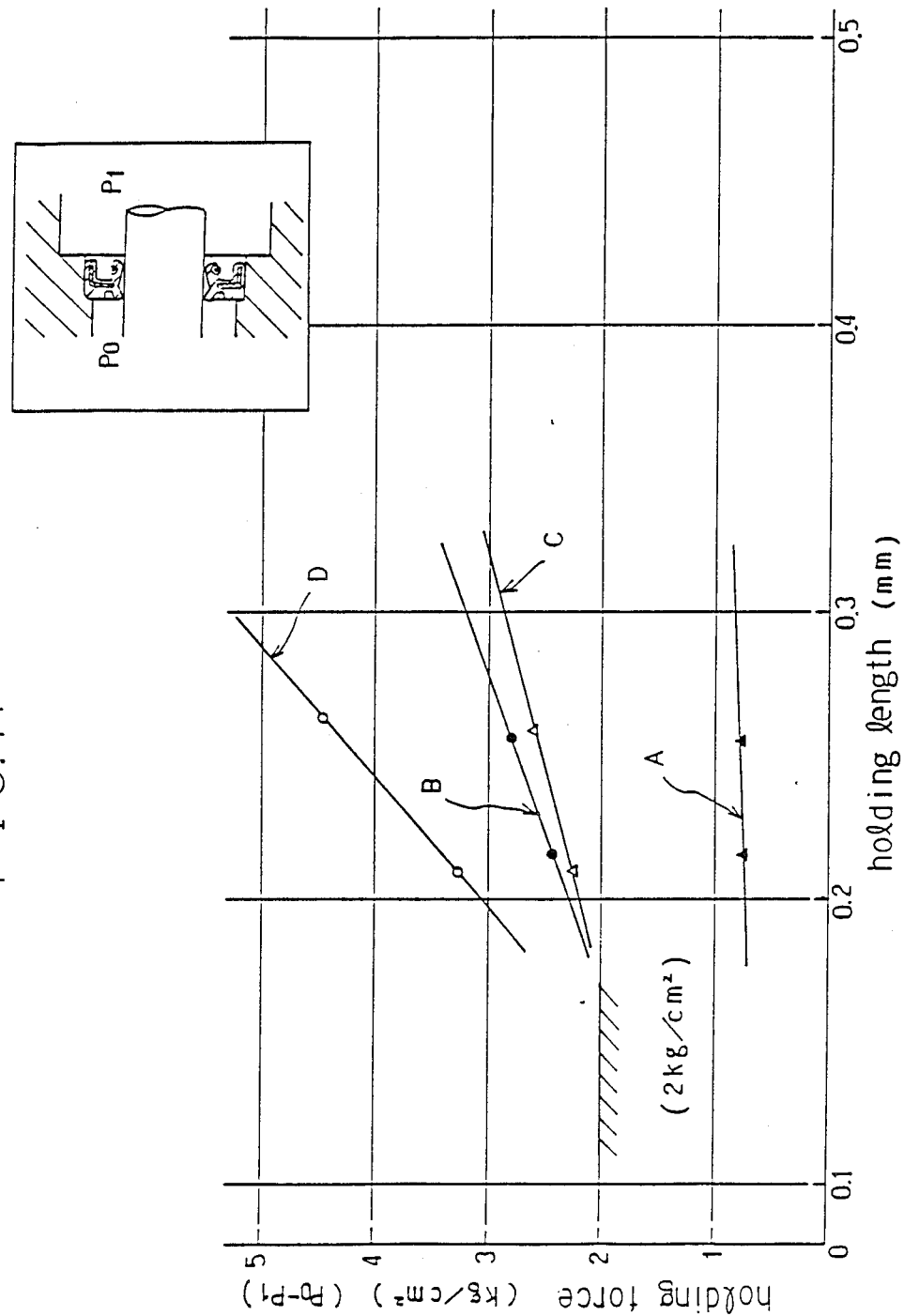
FIG. 11 is a diagram showing the relationship between the holding length of the seal member and the holding force.

An inclining wall 291 is formed at the opening end of the first holding portion 223 so that the seal member 223 can be smoothly inserted into the first holding portion 223. A first and a second contacting groove 293 and 294 are formed at the inner surface of the first holding portion 223 so that the inner surface of the contacting groove 293 and 294 incline with the inner surface of the first holding portion 223. In this manner the seal member 233 can be inserted into the holding portion 223 without being disturbed by the contacting groove 293 and the seal member 233 is prevented from dropping off the holding portion 223 after the seal member 233 is inserted into the holding portion 223 (as shown in FIG. 10). FIG. 11 shows the efficiency of the contacting grooves 293 and 294 FIG. 1 shows the relationship between the deforming amount of the first seal member 233 and the pressure difference between both sides of the first seal member 233. The solid line A shows the relationship where condition that the holding portion does not have any contacting groove and the working fluid permeates between the seal member 233 and the holding portion 223. The solid line B shows the relationship where the holding portion does not have a contacting groove and no working fluid exists between the first seal member 233 and the first holding portion 223. The solid line C shows the relationship where the holding portion 223 has the contacting grooves 293 and 294 and wording fluid exists between the first seal member 233 and the first holding portion 223. Finally, the solid line D shows the relationship where the holding portion 223 has the contacting grooves 293 and 294 and no working fluid exists between the first seal member 233 and the first holding portion 223. As shown from FIG. 11, the contacting grooves 293 and 294 can effectively hold the first seal member 233 within the holding portion 223.

The second seal member 241 is spaced from the first seal member 233 by a predetermined distance for example about 5 mm so that a constant pressure chamber 245 is formed within the side surface of the first seal member 233, the side surface of the second seal member 241, the inner surface of the pump housing and the outer surface of the shaft 213. The atmospheric pressure is introduced into the constant pressure chamber 245 through a constant pressure hole 253 formed in the pump housing 131 so that the pressure within the constant pressure chamber is always kept under the atmospheric pressure.

A ring plate 251 made of an elastic material such as rubber or synthetic resin is provided within the constant pressure chamber 245. The ring plate 251 can also be made of another material such as stainless steel. Since the ring plate 251 is fixed to the outer surface of the shaft 213, the ring plate rotates within the constant pressure chamber. The side portion of the ring plate 251 faces to the constant pressure hole 253. The constant pressure hole 253 has an inner diameter of about 2 mm.

Figure 3:
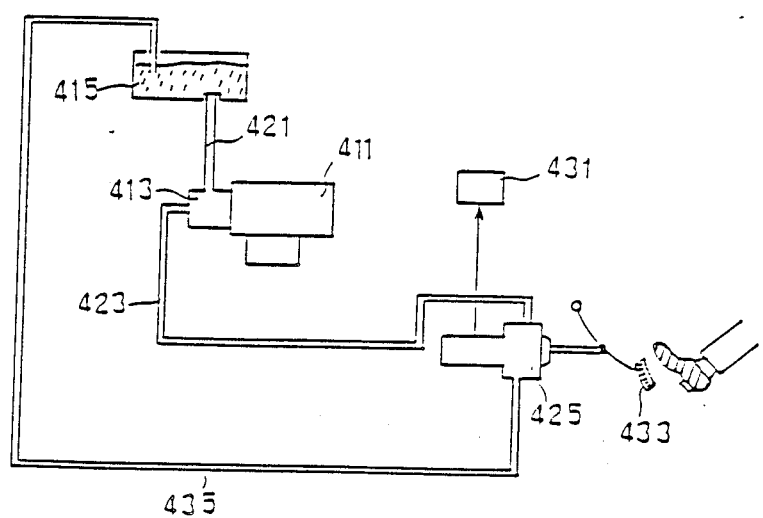
FIG. 3 explains an usage of the pump shown in FIG. 1.

The operation of the radial plunger pump of the present embodiment is described hereinafter. As shown in FIG. 3, the radial plunger pump is used as a supplying pump for supplying brake fluid of the automotive brake system. The brake fluid within the reservior 415 is sucked toward the pump 413 through the suction path 421. The brake fluid discharged from the pump 413 is introduced into a master cylinder 425 through a discharge path 423. The pressurized oil is supplied to each of a wheel cylinder 431 in accordance with the movement of the brake pedal 433. The brake fluid is then returns to the reservior 415 through a recovery path 435.

Figure 6:
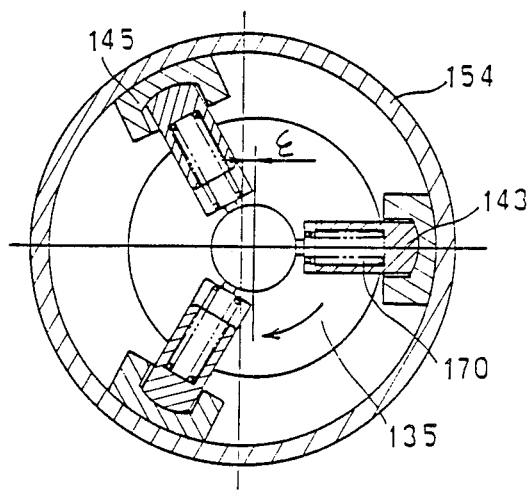
FIG. 6 is a sectional view showing a pump portion of the pump shown in FIG. 1.

The operation of the motor 411 is controlled by a controller (not shown). The rotation of the motor 411 makes the rotor 135 rotate within the suction chamber 133. Since the central axis of the eccentric ring 151 is off-set from the central axis of the pintle portion as shown in FIG. 2, the piston 143 reciprocates within the cylinder hole 141 in accordance with the rotation of the rotor 135. The volume within the pump chamber 178 formed between the piston 143 and the cylinder hole 141 is varied in accordance with the reciprocation of the piston 143. The inner race 154 rotates synchronously with the rotor 135 so that the shoe 135 always contacts with the inner race 154. The shoe 145, however, wobbles against the top end of the piston 143 as shown in FIG. 6. The movement of the shoe 145 against the piston 143 is permitted because the enough space is formed within the holding hole 148 of the shoe 145.

Figure 12:
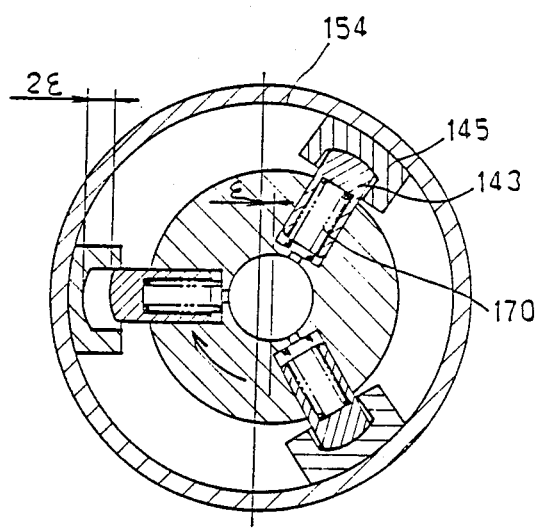
FIG. 12 is a sectional view showing the pump portion of the pump shown in FIG. 1.

The piston 143 is biased toward the shoe 145 by the spring 170 and the centrifugal force. However, the piston 143 may remain within the cylinder under the special condition such as the temperature of brake fluid is low enough to cause high viscous force (as shown in FIG. 12). Since the holding hole of the shoe has the depth p deeper than the eccentric amount ε, the shoe 145 will not drop off the top end of the piston 143 even in such a case.

The brake fluid within the suction chamber 133 is sucked toward the pump chamber 178 through a suction connecting port 123 and a suction groove 125 while the volume of the pump chamber 178 increases. The brake oil within the pump chamber 178 is then discharged toward discharge path 423 through the discharge connecting port 125 and the discharge port 113 while the volume of the pump chamber 178 decreases. The pressure of the brake oil within the suction chamber 133 should vary in accordance with the operation of the pump. Since the brake oil within the suction chamber 133 is supplied from the reservior 415, and since the reservior 415 is located higher than the pump 413, the pressure of the brake oil within the suction chamber 133 has a head of about 10–20 mm Hg when the pump 413 is not operated.

The pressure of the brake oil within the suction chamber 133 decreases to below the atmospheric pressure when the pump 413 operates because the because the brake oil within the suction chamber 133 is sucked toward the pump chamber 178. The negative pressure of the brake oil within the suction chamber 133 may decrease to as low as −300− −400 mm Hg under certain circumstances such as if the temperature of the working fluid is low enough to increase the viscous force of the brake oil. The suction chamber is evacuated before the oil is introduced so that the suction chamber 133 is temporally a vacuum.

Even though the pressure within the suction chamber 133 can vary, the leakage of the brake oil from the suction chamber toward the motor housing is prevented by the first and second seal member 233. Since the constant pressure chamber is formed at one side of the first seal member 233, the pressure difference between both sides of the first seal member 233 are mainly a result of the variation of the pressure within the suction chamber. Since the first seal member 233 is inserted into the first and second contacting grooves 293 and 294, the first seal member 233 is securely fixed to the first holding portion 223.

The motor rotates within the motor housing 315 when the voltage is supplied. The rotation of the motor 411 and commutator 313 makes the airflow and such airflow varies the pressure applied to the second seal member 241.

Since the ring plate 251 is provided within the constant pressure chamber 245, in order to increase the pressure at the opening portion of the constant pressure port 253, the foreign objects are prevented from being introduced into the constant pressure chamber 245. Furthermore, since constant pressure port 253 is formed at the lowermost portion of the pump housing 131, the introduction of the foreign objects or any other water is to be prevented to be.

Figure 13:
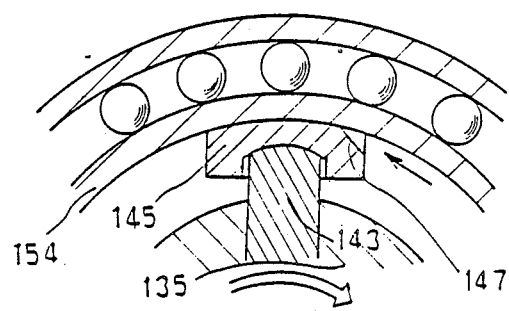
FIG. 13 is a sectional view showing a part of the pump portion of another embodiment.
Figure 14:
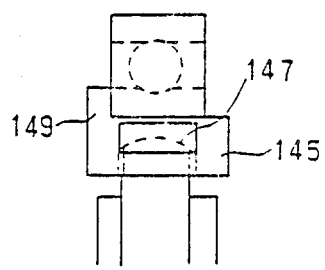
FIG. 14 is a front view showing the shoe shown in FIG. 13.

FIGS. 13 and 14 show another embodiment of the present invention. The shoe 145 shown in FIGS. 13 and 14 has a notch portion 147 in order to limit the vibration of the shoe 145. Since the central axis of the rotor 135 is offset from the central axis of the inner race 154, the shoe 145 has a tendency to wobble slightly, and such wobbling movement makes noise.

Figure 15:
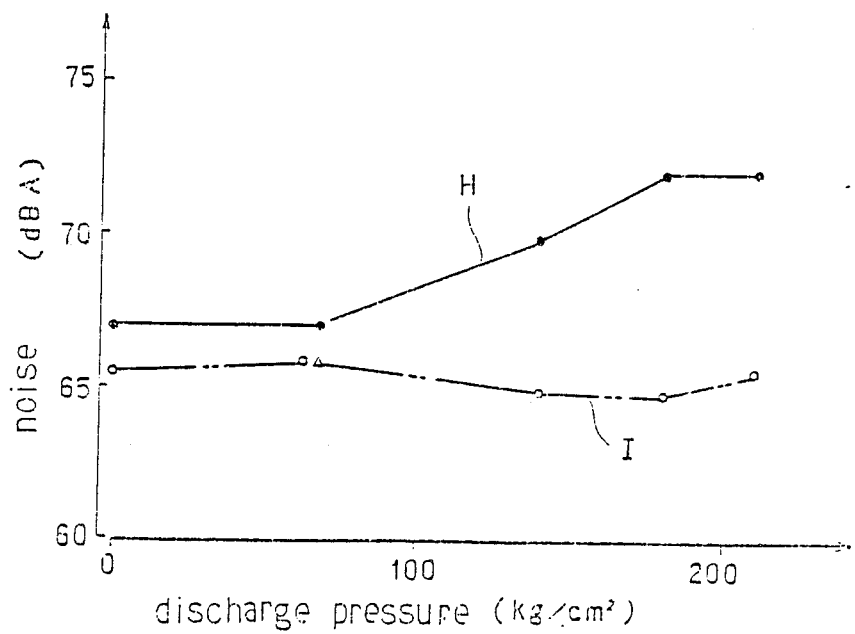
FIG. 15 is a diagram showing the relationship between the discharge pressure and the noise level.

Since the brake oil within the suction chamber 133 is introduced into the contacting surface between the notch portion 147 and the inner race 154, the vibration of the shoe 145 can be reduced. Thus, the noise caused by the vibration of the shoe 145 is reduced, as shown in FIG. 15. More particularly, the solid line H shows the noise caused by the shoe 145 which has no notch portion 145, the dotted line I shows the noise caused by the shoe 145 having the notch portion 147. As clearly shown from the FIG. 15, then, the shoe having the notch portion 147 can reduce the noise.

What is claimed is:

1. A radial plunger pump driven by a motor comprising:
   a motor housing,
   a motor mounted within said motor housing,
   a pump housing mounted to one side of said motor housing,
   a shaft rotatably mounted within said pump housing, said shaft being operatively coupled to and rotated by said motor,
   a rotor eccentrically mounted within said pump housing and operatively coupled to said shaft for rotation therewith, said rotor having a plurality of radial cylinders therein,
   a plurality of plungers reciprocally provided within each of said cylinders so that a pump chamber is formed within each said cylinder at a bottom portion of each said plunger, a volume of each said pump chamber being varied in accordance with rotation of said rotor, an inlet passage through which working fluid is introduced into each said pump chamber, an outlet passage through which working fluid is discharged from each said pump chamber, a first seal member provided within said pump housing for limiting the leakage of the working fluid along said shaft from said pump housing toward said motor housing, a second seal member provided within said pump housing at a side of said first seal member for limiting the leakage along said shaft so that a constant pressure chamber is formed between said first seal member and said second seal member, said pump housing having a constant pressure port which connects said constant pressure chamber to an outer atmosphere, and plate means mounted to said shaft within said constant pressure chamber for preventing the entry of foreign objects into the constant pressure chamber through the constant pressure port, said second seal member prohibiting the leakage of working fluid from said constant pressure chamber along said shaft whereby said motor is protected from the working fluid.

2. A radial plunger pump driven by a motor as claimed in claim 1, wherein .

a seal surface of said first seal member is larger than a seal surface of said second seal member.

3. A radial plunger pump driven a mortor according to claim 1, wherein said constant pressure port faces to said plate.

4. A radial plunger pump driven by a motor as claimed in claim 1, further comprising:

an eccentric ring mounted to an outer side of said rotor, a central axis of said eccentric ring being off-set by a predetermined amount, and a shoe member mounted between a top portion of said plunger and an inner surface of said eccentric ring, said shoe member having a holding groove in which said top portion of said plunger is inserted, a depth of said holding groove being about two times larger than an off-set amount of said eccentric ring.

5. A radial plunger pump driven by a motor as claimed in claim 1, further comprising:

an eccentric ring mounted to an outer side of said rotor, a shoe member mounted between a top portion of said plunger and an inner surface of said eccentric ring and a rotating member connecting said rotor to said shaft for rotating said rotor in synchrony with said shaft, said rotating member having an inclined wall for defusing working fluid within said pump housing.

6. A radial plunger pump driven by a motor as claimed in claim 1, further comprising:

an eccentric ring mounted to an outer side of said rotor, a shoe member mounted between a top portion of said plunger and an inner surface of said eccentric ring and a rotating member connecting said rotor to said shaft for rotating said rotor in synchrony with said shaft, said shoe member having a notch portion at an outer surface for introducing working fluid within said pump housing into the gap between said outer surface of said shoe member and an inner surface of said eccentric ring.

7. A radial plunger pump driven by a motor as claimed in claim 1, further comprising:

an eccentric ring mounted to an outer side of said rotor and a shoe member mounted between a top portion of said plunger and an inner surface of said eccentric ring, said shoe member having a holding groove in which said top portion of said plunger is inserted, an inner diameter of said holding groove being calculated by the formula $$D = Dp + \frac{2r\epsilon}{R - S}$$

Dp: an outer diameter of said plunger
r: a radius of said top portion of said plunger
R: a radius of said eccentric ring
S: a thickness of said shoe member.

8. A radial plunger pump driven by a motor as claimed in claim 7, wherein:

said shoe member has a side guide portion which a side portion of said eccentric ring abuts for limiting the movement of said pump portion along a longitudinal axis of said shaft.

9. A radial plunger pump driven by a motor comprising:

a motor housing, a motor mounted within said housing, a pump housing mounted to one side of said motor housing, a shaft rotatably mounted within said pump housing, said shaft being operatively coupled to and rotated by said motor, a rotor eccentrically mounted within said pump housing and operatively coupled to said shaft for rotation therewith, said rotor having a plurality of radial cylinders therein, a plurality of plungers reciprocally provided within each of said cylinders so that a pump chamber is formed within each said cylinder at a bottom portion of each said plunger, a volume of each said pump chamber being varied in accordance with rotation of said rotor, an inlet passage through which working fluid is introduced into each said pump chamber, an oulet passage through which the working fluid is discharged from each said pump chamber, a first holding portion provided within said pump housing, a first seal member fixed to said first holding portion and limiting the leakage of the working fluid along said shaft from said pump housing toward said motor housing, a second holding portion provided within said pump housing at a side portion of said first seal protion, a second seal member fixed within said second holding portion so that said first sealing member and said second sealing member define a constant pressure chamber therebetween, said pump housing further having a constant pressure port through which atmospheric pressure is introduced into said constant pressure chamber, plate means mounted within said constant pressure chamber for preventing the entry of foreign objects into the constant pressure chamber through the constant pressure port, said second seal member prohibiting the leakage of working fluid from said constant pressure chamber along said shaft whereby said motor is protected from the working fluid, and said first holding portion having a contacting groove in which said first seal member is inserted in order to prevent said first seal member from falling from said first holding portion.

10. A radial plunger pump according to claim 9 wherein:

a seal surface of said first seal member is larger than a seal surface of said second seal member.

11. A radial plunger pump driven by a motor as claimed in claim 9, further comprising:

an eccentric ring mounted to an outer side of said rotor, a central axis of said eccentric ring being off-set by a predetermined amount, and a shoe member mounted between a top portion of said plunger and an inner surface of said eccentric ring, said shoe member having a holding groove in which said top portion of said plunger is inserted, a depth of said holding groove being about two times larger than an off-set amount of said eccentric ring.

12. A radial plunger pump driven by a motor as claimed in claim 9, further comprising:

an eccentric ring mounted to an outer side. of said rotor, a shoe member mounted between a top portion of said plunger and an inner surface of said eccentric ring and a rotating member connecting said rotor to said shaft for rotating said rotor in synchrony with said shaft, said rotating member having an inclined wall for defusing working fluid within said pump housing.

13. A radial plunder pump driven by a motor as claimed in claim 9, further comprising:

an eccentric ring mounted to an outer side of said rotor, a shoe member mounted between a top portion of said plunger and an inner surface of said eccentric ring and a rotating member connecting said rotor to said shaft for rotating said rotor in synchrony with said shaft, said shoe member having a notch portion at an outer surface for introducing working fluid within said pump housing into the gap between said outer surface of said shoe member and an inner surface of said eccentric ring.

14. A radial plunger pump as claimed in claim 9, further comprising:

an eccentric ring mounted to an outer portion of said plunger and a shoe member (provided) mounted between a top portion of said plunger and an inner surface of said eccentric ring, said shoe member having a holding groove in which said top portion of said plunger is inserted, an inner diameter of said holding groove being calculated by the formula $$D = Dp + \frac{2r\epsilon}{R - S}$$

Dp: an outer diameter of said plunger
r: a radius of said top portion of said plunger
R: a radius of said eccentric ring
S: a thickness of said shoe member.

15. A radial plunger pump driven by a motor as claimed in claim 14, wherein:

said shoe member has a side guide portion which a side portion of said eccentric ring abuts for limiting the movement of said pump portion along a longitudinal axis of said shaft.

* * * * *